United States Patent [19]
Price et al.

[11] Patent Number: 5,995,143
[45] Date of Patent: Nov. 30, 1999

[54] ANALOG CIRCUIT FOR AN AUTOFOCUS MICROSCOPE SYSTEM

[75] Inventors: Jeffrey H. Price, San Diego; Miguel Bravo-Zanoguera, La Jolla, both of Calif.

[73] Assignee: Q3DM, LLC, San Diego, Calif.

[21] Appl. No.: 08/796,196

[22] Filed: Feb. 7, 1997

[51] Int. Cl.⁶ .................................................. H04N 5/202
[52] U.S. Cl. .......................................................... 348/345
[58] Field of Search .............................. 348/207, 80, 345, 348/348, 349, 351, 354, 355, 356; 250/201.2, 201.3, 306, 307, 308, 309, 310; 359/383, 384, 410; H04N 5/225; G03B 13/00

[56] References Cited

U.S. PATENT DOCUMENTS

| | | | |
|---|---|---|---|
| 5,357,280 | 10/1994 | Yajima et al. | 348/349 |
| 5,499,097 | 3/1996 | Ortyn et al. | 356/372 |
| 5,745,172 | 4/1998 | Miyashita | 348/241 |

FOREIGN PATENT DOCUMENTS

WO 96/10196  4/1996  WIPO.

OTHER PUBLICATIONS

L.F. McKeogh, J.P. Sharpe & K.M. Johnson, "Design Note—A low-cost automatic translation and autofocusing system for a microscope", Meas. Sci. Technol., No. 6, pp. 583–587, 1995.

E. Johnson et al., "Metaphase Spread Detection and Focus Using Closed Circuit Television", *The J. of Histochemistry and Cytochemistry*, 22:7, pp. 536–545, XP002064321, 1974.

PCT—Notification of Transmittal of the International Search Report (Form PCT/ISA/220) International Appl. No. PCT/US/98/00318.

PCT—International Search Report (Form PCT/ISA/210).

"Comparison of Phase–COntrast and Fluorescence Digital Autofocus For Scanning Microscopy", Jeffrey H. Price & David A. Gough, Cytometry 16:283–297 (1994).

*Primary Examiner*—Tuan Ho
*Attorney, Agent, or Firm*—Gray Cary Ware Freidenrich

[57] ABSTRACT

An analog circuit for an autofocus microscope system measures a degree of focus of an object directly from the video signal of a microscope CCD camera. The circuit then returns an index to a host computer for the purpose of adjusting the position of the microscope's objective lens to bring the object in focus. Best focus is found by comparing indices at several different vertical positions. The criterion adopted for determining the degree of focus is derived from the energy distribution of the video signal spectrum. The high frequency energy of the video spectrum is a maximum at best focus and as the optics defocus, the distribution shifts to lower frequencies. Low cost, real time autofocus is achieved with the analog circuitry of this invention, replacing more expensive dedicated, real time image processing hardware.

20 Claims, 8 Drawing Sheets

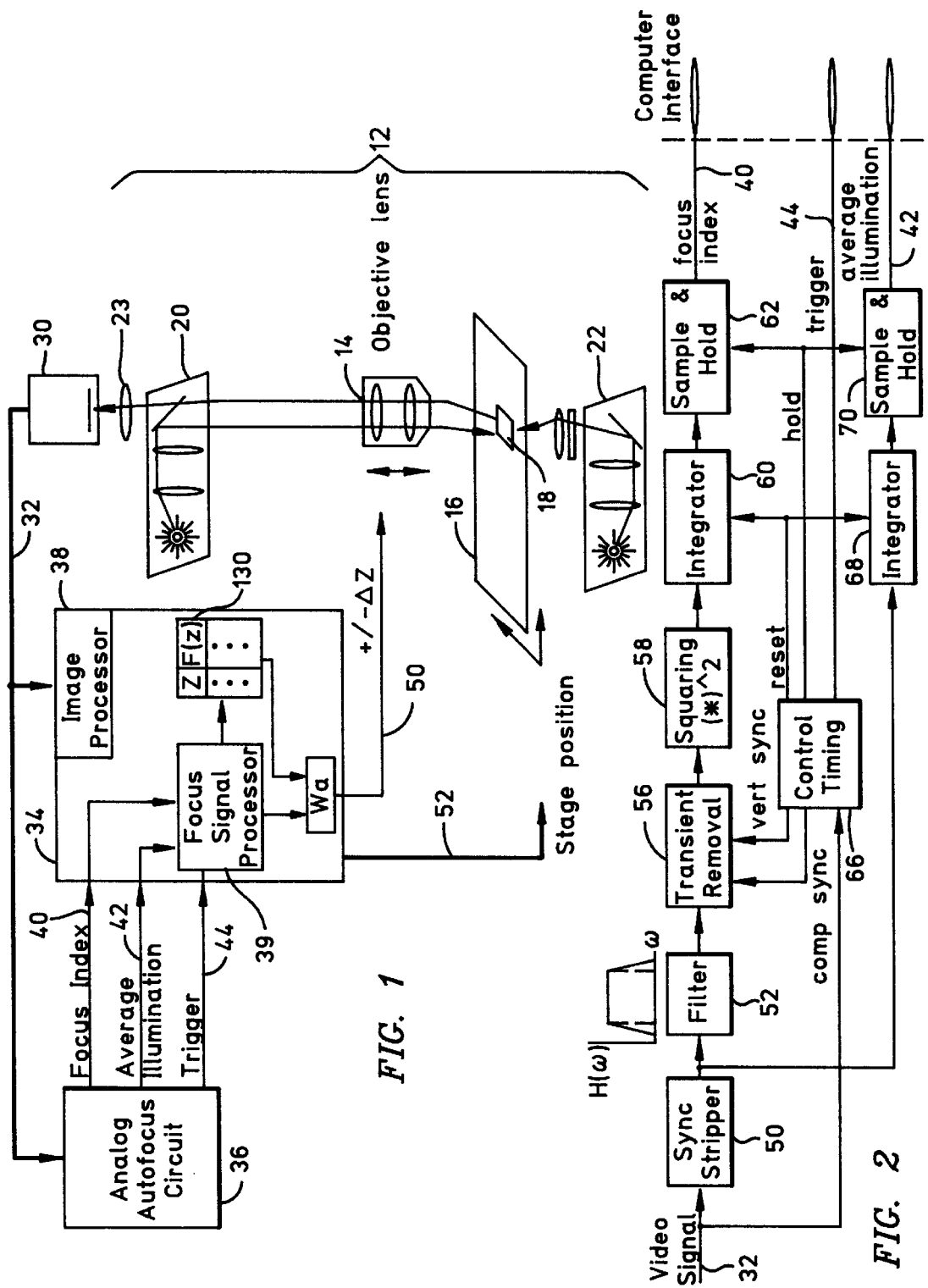

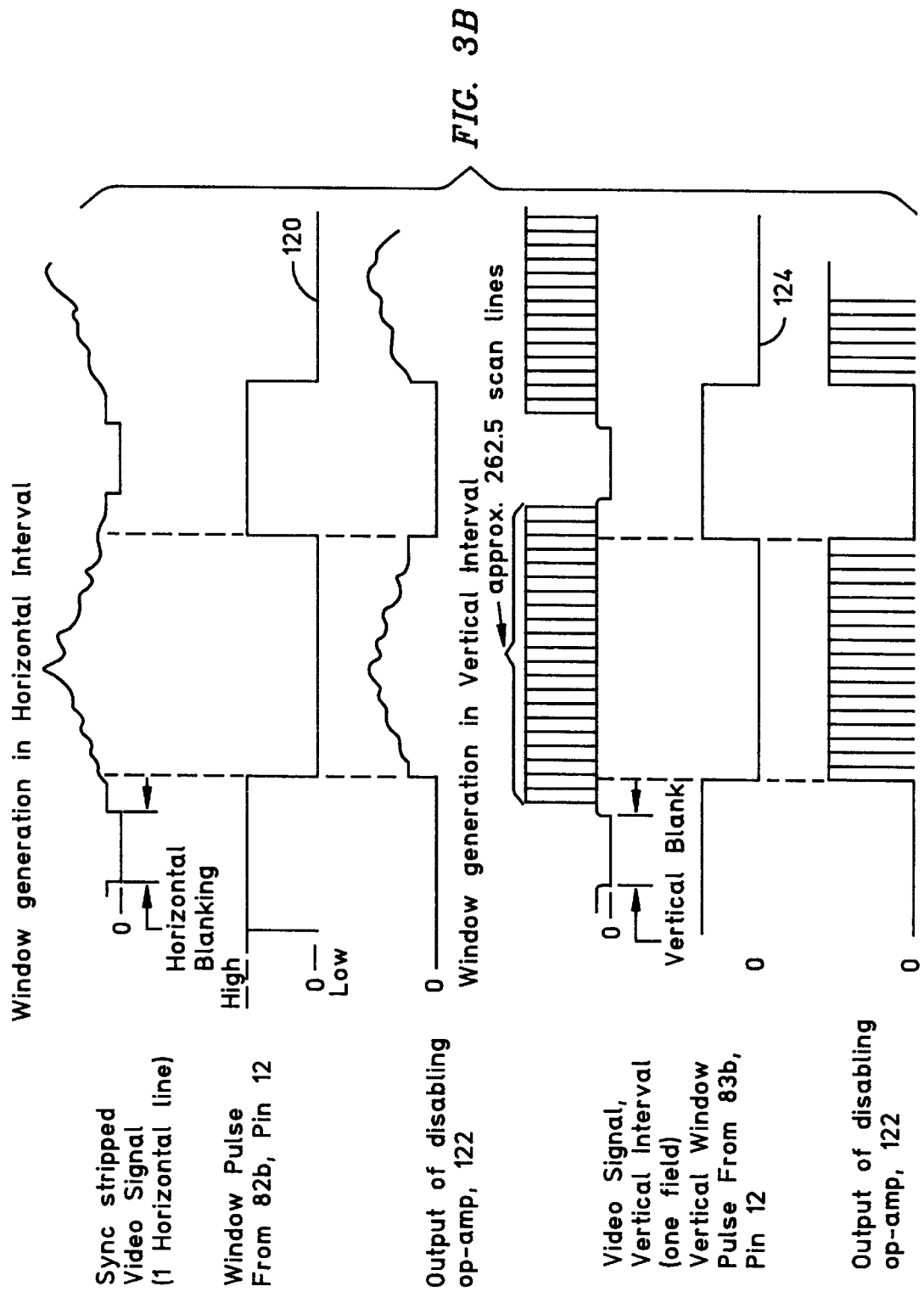

ANALOG CIRCUIT FOR AN AUTOFOCUS MICROSCOPE SYSTEM

BACKGROUND OF THE INVENTION

The invention is in the field of microscopy in which focus of an image, observed by way of a microscope, is automatically adjusted. Such automatic adjustment of microscope focus is termed "autofocus". The invention is practiced in an autofocus system. More particularly, the invention concerns the incorporation of an analog circuit that accounts for the effect of a transfer function attributable to the microscope optics of the autofocus system, eliminates scanning artifacts that impair the autofucus function, and corrects for illumination instability.

Autofocus is essential in automated microscopy to overcome the problems of mechanical instability, the irregularity of glass slides and coverslips, the movement of live specimens and the effects of thermal expansion. Autofocus can overcome these limitations and allow accurate and reproducible measurements in fully automated quantitative microscopy. Many experiments will benefit from autofocus and examples for which it is indispensable include:

(a) scanning large areas at high resolution where depth of field is limited (e.g. cervical cancer screening, with 10,000 microscope fields per slide).

(b) time-lapse experiments (e.g. hours to days).

(c) time-lapse scanning cytometry combining (a) and (b), where autofocus speed becomes a fundamental determinant of temporal resolution.

Whatever the source of instability, autofocus will compensate if the positional variations have longer time constants than the autofocus correction.

An autofocus system typically includes an automated microscope including magnifying optics and an adjustable stage on which a microscope slide is mounted for magnified observation of a specimen on the slide. Motors coupled to the stage provide horizontal adjustment of the location of the stage. Means are provided for vertial (Z-axis) adjustment between the magnifying optics and stage. These may include an arrangement for adjusting the Z-axis position of an objective lens, or by Z-axis adjustment of the stage. A camera receives a magnified image via the magnifying optics and provides an electronic signal representing the magnified image to autofocus electronics. The autofocus electronics process the signal according to a function that indicates the degree of focus, providing an adjustment (or error) signal to the vertical adjustment means. In response, the vertical adjustment means adjusts the vertical position of the objective lens or the stage, changing the focus of the magnified image. Other circuit may be included in an autofocus system for automatic translation (scanning) of a specimen on the slide.

Several methods have been tested for autofocus, including resolution, contrast and entropy. It has recently been shown that a measurement of optical resolution performs autofocus robustly and accurately. Price, J. H. and Gough, D. G., "Comparison of Phase-Contrast and Fluorescence Digital Autofocus for Scanning Microscopy," Cytometry 16, pp. 283–297, 1994. This experimental evidence reinforces the following logical definition: the highest resolution occurs at best focus. Details blur as an image is defocused and resolution is lost. Resolution can be measured by analyzing the Fourier frequency spectrum with filters that isolate the high frequencies. The sum of the squares of the high frequencies (signal power) can then be used as a measured of resolution. In spectral terms, this can be a highpass or bandpass filter. A typical filter is the implementation of the first derivative of the image intensity. Another is the laplacian filter, which is a measure of the second derivative of the image intensity. The laplacian filter has more predominant highpass characteristics, measuring resolution at a smaller scale. Squaring magnifies the differences between function values.

To compare different criteria, an autofocus system typically computes focus functions as a function of the Z-axis position. A value of the focus function is calculated from an image acquired at each Z-axis position. According to Price et al., a typical equation for the focus function using a digital filter consists of convolving the image $i_{xy}$ with a one dimensional highpass filter, obtaining the sum of squares and normalizing to reduce the effect of unstable illumination. Such a relationship is given in equation (1).

$$f(z) = \Sigma\Sigma([-1\ 2\ -1]*i_{xy})^2 / [(1/XY \text{ of pixels})(\Sigma\Sigma i_{xy})]^2 \quad (1)$$

where z=vertical position and $i_{xy}$ is the intensity at position (x,y).

Analog focus circuits have been reported in Ali Kujoory, M., Mayall, B. H. and Mendelsohn, M. L., "Focus-Assist Device for a Flying-Spot Microscope," IEEE Transactions on Biomedical Engineering, 20(2), pp. 126–32, 1973, and in Johnson, E. T. and Goforth, L. J., "Metaphase Spread Detection and Focus Using Closed Circuit Television", Journal of Histochemistry and Cytochemistry, 22(7), pp. 536–587, 1974. McKeogh, L., Sharpe, J., and Johnson, K., in "A Low-Cost Automatic Translation and Autofocusing System for a Microscope", Meas. Sci. Technol., 6, pp. 583–587, 1995, describe an analog circuit for autofocus in microscopy. These designs, however do not take into account the effect of the autofocus system transfer function in the choice of the high frequency filter. Additional important features not considered in these previous implementations include the filter end effects between horizontal lines in the video signal and normalization for correction of illumination instability. Further, in low information content images, background intensity changes can dominate via filter distortion at the ends of horizontal lines.

SUMMARY OF THE INVENTION

The goal of this invention is to implement fast, accurate autofocus at a low cost for use in, for example, scanning microscopy, of fluorescent stained biologic specimens.

The invention is practiced in an autofocus system having a microscope, a source of video signal representing a magnified image produced by the microscope, and an automatic microscope focus control that focuses the microscope in response to a focus index signal. The invention is embodied in this context by an analog circuit that produces the focus index signal. The circuit includes a filter that provides a filtered signal representing predetermined frequencies in the video signal. A transient remover is connected to the filter for removing scanning artifacts from the filtered signal. A squaring circuit connected to the transient remover squares magnitudes of predetermined frequency components of the filtered signal. An integrator connected to the squaring circuit produces a focus index signal representing a degree of focus of the microscope by integrating the squared magnitudes of the frequency components of the filtered signal.

Preferably, the circuit further includes an integrator that produces an average illumination signal in response to the video signal. Both the focus index signal and the average illumination signal are combined by a processor in the focus control of the autofocus system to produce a focus position signal representing a focus position of the microscope. The focus control utilizes the focus position signal to adjust the microscope to the focus position.

Assuming a video signal produced by interlaced scanning, the transient remover may also create a window imposed on the video signal to define an area of the magnified image were a focus index signal will be produced.

An objective of the invention is therefore to provide an analog circuit for an autofocus system that produces a focus index signal representing a degree of focus.

A further objective is a provision by such a circuit of an average illumination signal that can be combined with a focus index signal by a processor to produce a focus position signal.

BRIEF DESCRIPTION OF THE DRAWINGS

FIG. 1 is a block diagram of a complete autofocus microscope system;

FIG. 2 is a block diagram of an analog circuit for an autofocus microscope system;

FIGS. 3a and 3b are plots of waveforms that illustrate operation of the analog circuit of FIG. 2;

DETAILED DESCRIPTION OF THE PREFERRED EMBODIMENTS

Figure 3A:
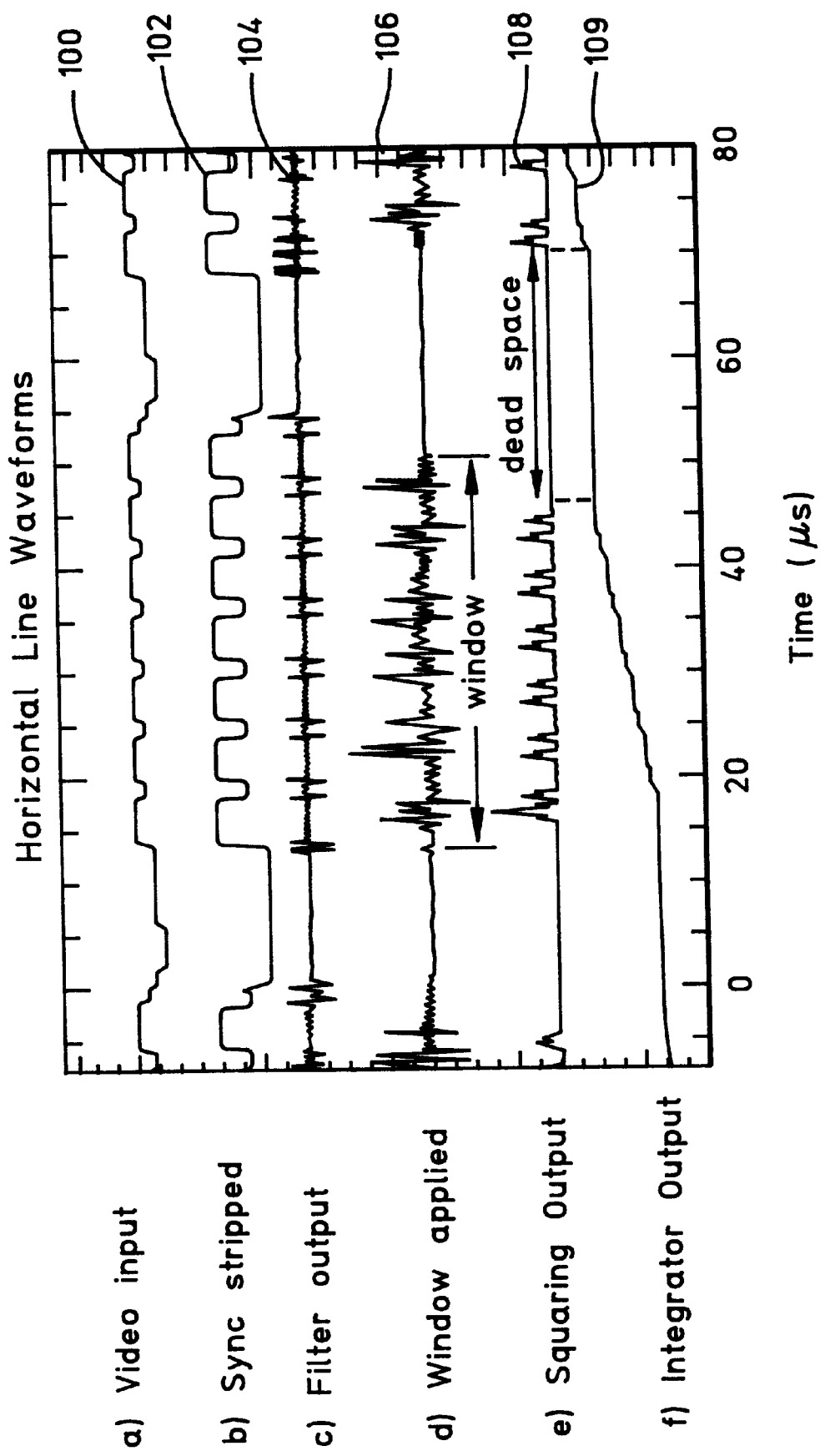
Figure 4A:
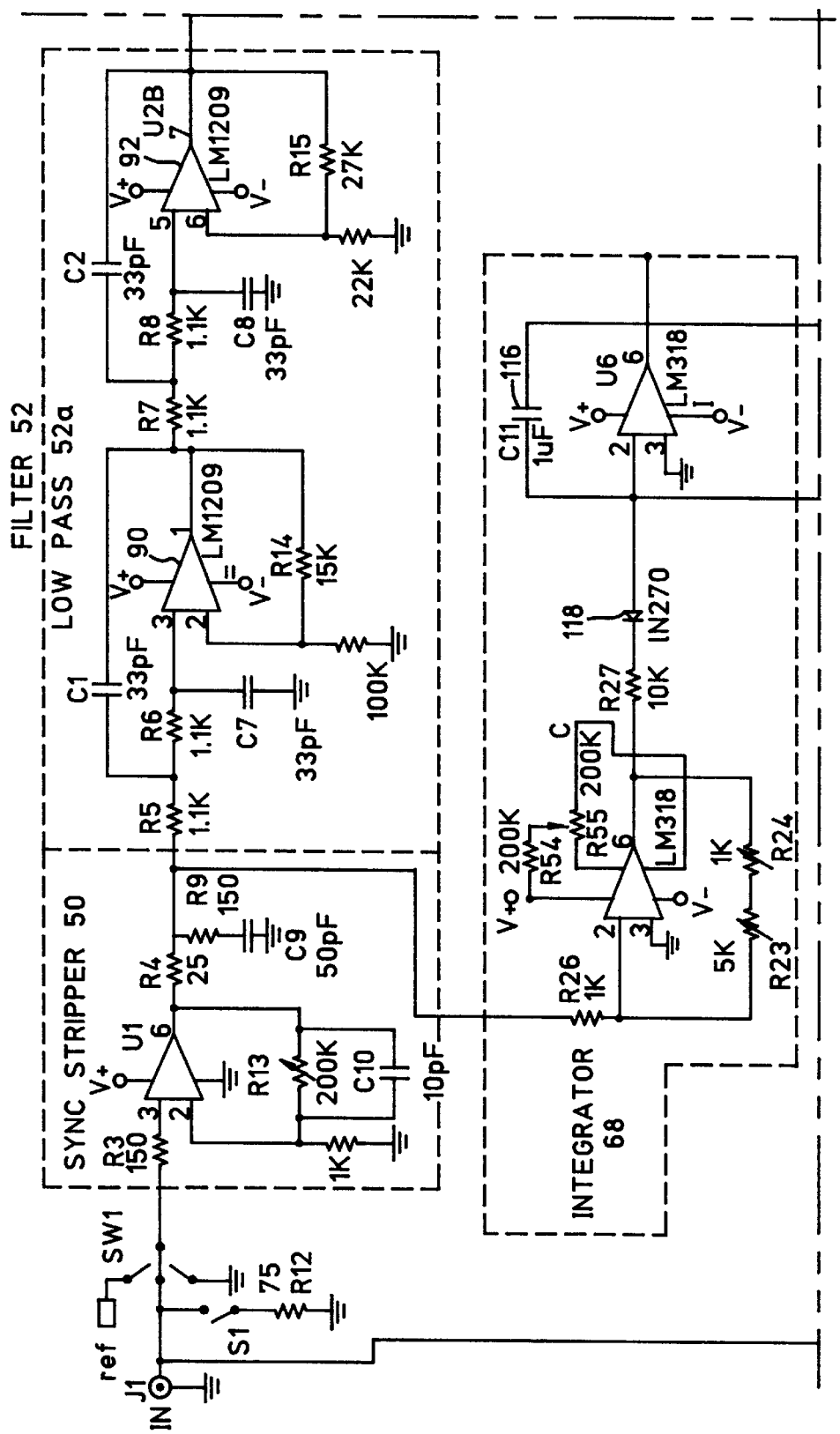
FIG. 4, comprising of FIGS. 4A, 4B, 4C and 4D is an electronic circuit schematic diagram illustrating the best mode for implementing the analog circuit of FIG. 2.
Figure 4B:
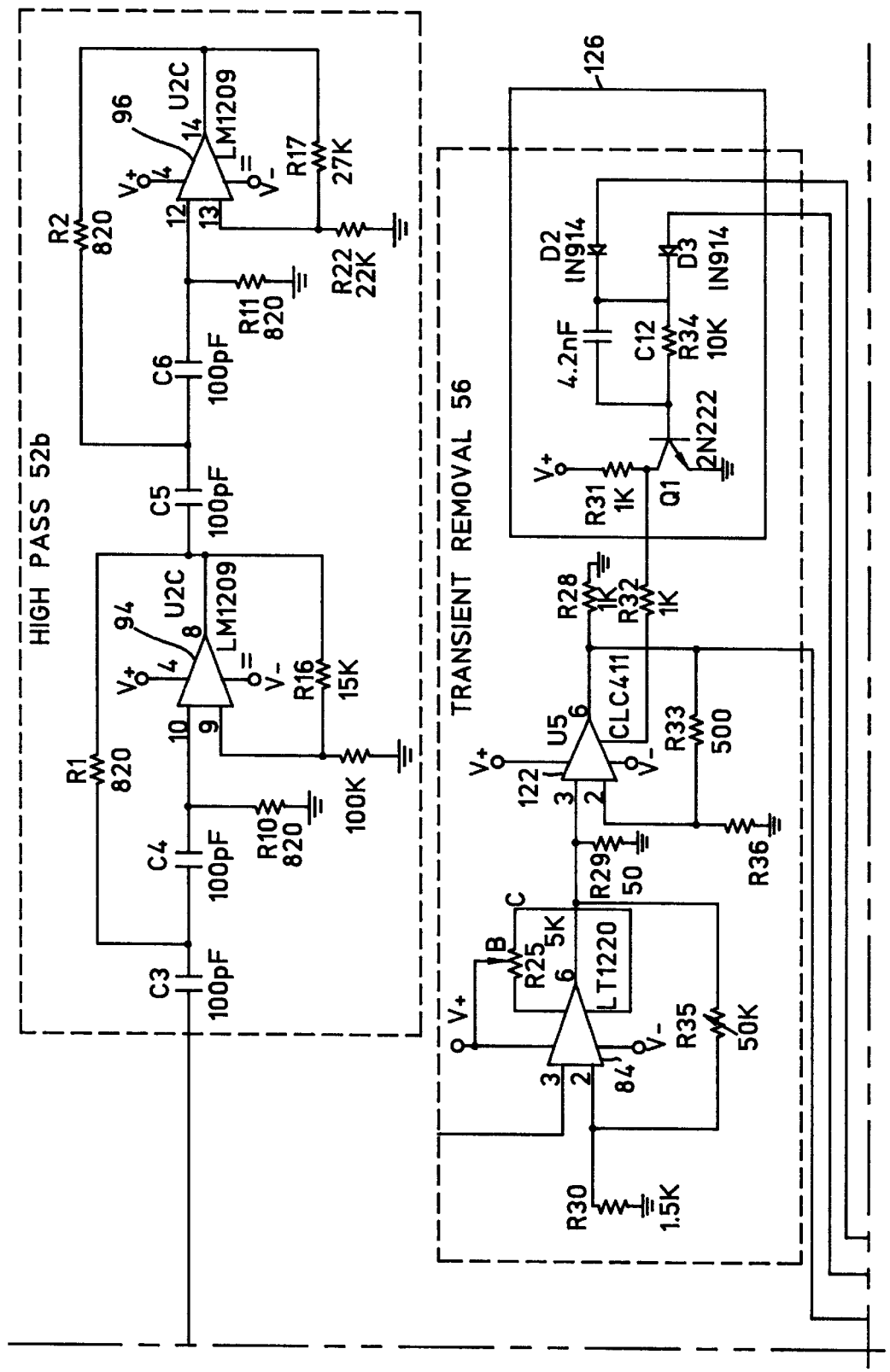
Figure 4C:
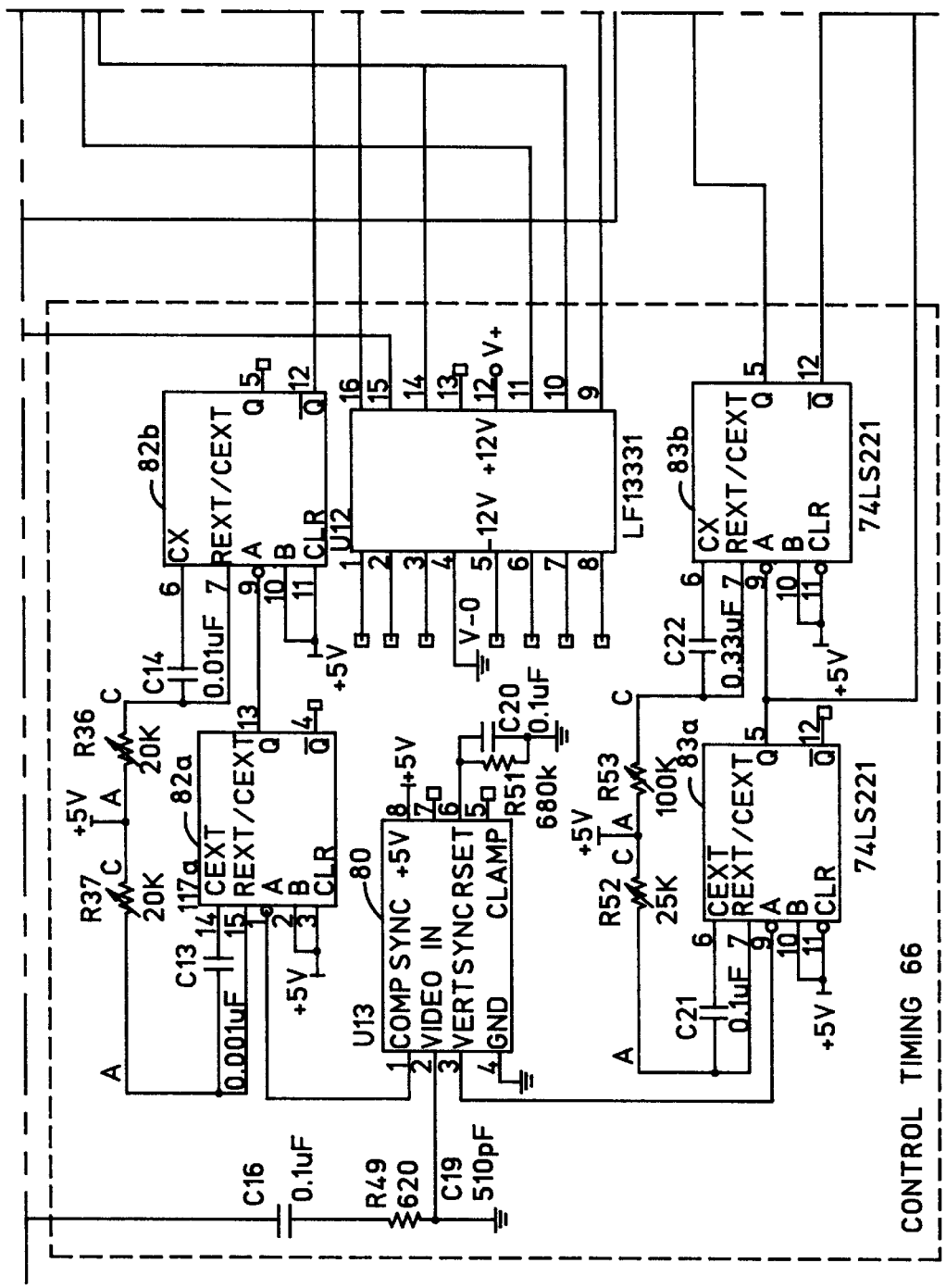
Figure 4D:
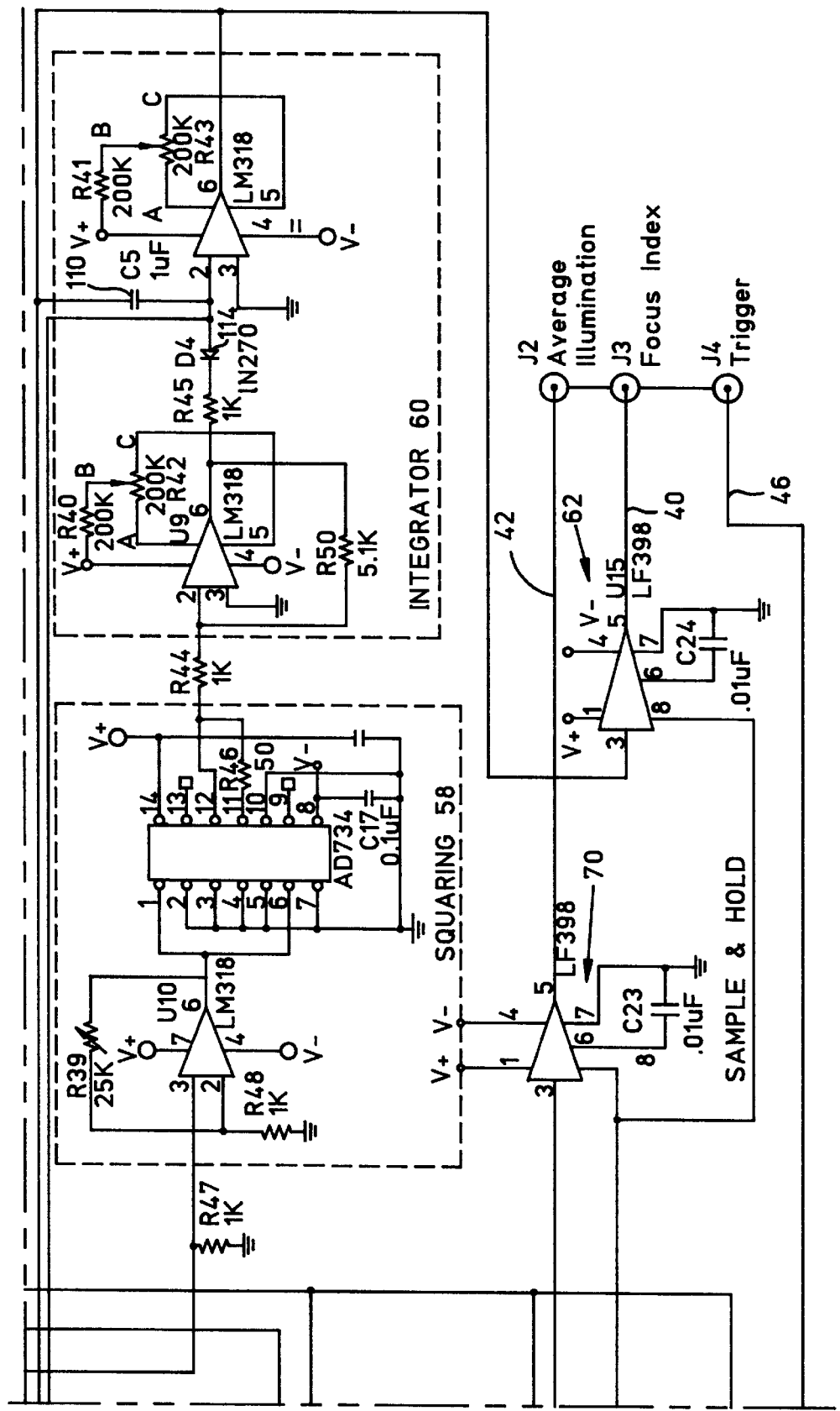

Referring now to the figures where like reference numerals indicate identical elements, in FIG. 1 there is illustrated an autofocus system 10 including a microscope 12 that includes an objective lens 14, and a microscope stage 16 on which a slide may be mounted. The stage 16 is translatable in the X and Y directions so that a succession of areas on a microscope slide carried on the stage can be scanned according to known methods. One such area is indicated by reference numeral 18. The microscope includes means 20 for illumination of fluorescent stained biologic specimens and means 22 for phase contrast or other transmitted microscopy illumination. An image of the area 18 is magnified by magnifying optics of the microscope 12 that include the objective lens 14 and a zoom lens 23. Each magnified image is acquired by a camera 30 that produces, by interlaced scanning, a video signal representing a magnified image, and including various synchronization components that are necessary for interlaced scanning. The video signal is provided on signal path 32 to a programmed, general purpose digital computer 34 that includes, among other functions, an image processor 38 and a focus signal processor 39.

The video signal is also provided to an analog autofocus circuit 36 that embodies the invention. The analog autofocus circuit 36 produces a focus index signal, an average illumination signal, and a trigger signal, that are produced on a signal paths 40, 42 and 44, respectively to the focus processor 39 of the computer 34.

The focus processor 39 of the computer 34 constitutes an automatic microscope focus control that calculates a focus function signal in response to the focus index, average illumination, and trigger signals. A focus function signal is produced at each of a plurality of focus positions at the microscope 12. These are combined by the focus processor 39 to produce a focus position signal representing a focus position of the microscope 12. The focus position signal is provided on signal path 50 and used to control known means that adjust the position of the objective lens 14, thereby focusing the microscope 12. Other signals are provided on signal path 52 for adjusting the X and Y positions of the stage 16.

An autofocus system not including the analog autofocus circuit 36 is set forth at column 12, line 28-column 14, line 36 of U.S. Pat. No. 5,548,661, which is incorporated in its entirety by this reference.

Hardware and Experimental Methods

The autofocus system 10 was set up for phase contrast and brightfield illumination for analog operation according to the invention. Cells were imaged in a Nikon Optiphot microscope through a CF Fluor DL 40×C, 0.85 NA objective lens with Ph3 bright phase contrast. The images were further magnified through a Nikon CCTV 0.9–2.25 zoom lens onto a Dage VE-1000 CCD RS-170 camera, with a frequency response of 7 MHz. The microscope stage 16 was moved in the X, Y plane under control of the computer 34 by stepper motors for fluorescent image cytometry. Control of the microscope stage 16 was by way of a microstepping driver and an AT ISA-bus compatible computer board.

Focus was changed by changing the position of the objective lens 14 with a piezoelectric objective positioner (PIFOC) and an E-S810.10 closed loop controller (Polytec PI, Costa Mesa, Calif.). For movements of $\leq 1$ $\mu$m, the position of the objective lens 14 is stable in 10 ms. The position of the PIFOC was controlled by output from a digital-to-analog (D/A) converter in a Keithley Metrabyte (Taunton, Mass.) DAS 1600 data acquisition board incorporated in the computer 34. The 12-bit D/A converter divides the 100 $\mu$m range of the PIFOC into 4,096 steps of 24 nm each.

The image processor 38, using an RS-170 video input board, (the VLSI-150 by Imaging Technology Inc), captured the magnified image in the form of the video signal and applied an anti-aliasing filter of −3 dB at 4.2 MHz and −12 dB attenuation at 8 MHz. These values were used as a reference to design the filters of the analog circuit of this invention and make it comparable in response to the digital version.

Analog Circuit Implementation

The invention provides an analog autofocus circuit 36 that measures the degree of focus directly from the video signal of the camera 30 and solves previous design limitations. The block diagram of FIG. 2 and circuit diagram of FIG. 4 illustrate the functional components of this novel circuit. The criterion adopted for determining a degree of defocus was the relative energy contained in the magnified image as a function of spatial frequency. Under defocus, adjacent elements of the magnified image were blurred or averaged together, causing loss of higher spatial frequencies. By measuring the relative energy in these frequencies as a function of focal position, a criterion for determining the optimal focus position was established, since the energy changes monotomically and is maximum at focus. These assumptions hold for phase contrast only when high frequencies are utilized for the focus criteria. Monotonicity is often violated under these conditions when low frequencies are involved. Price et al., op cit.

The analog circuit 36 implements the focus function in the integral of the squared values of the video signal, as a measure of the energy in the image. The video signal is filtered prior to squaring to accentuate the high frequencies that are most dependent on focus. Equation (2) represents the processing achieved by the analog circuit 36 and the computer 34. In terms of circuit components, the filter 52 selects the range of frequencies from the video image signal and, after squaring and integrating, the analog circuit 36 produces a focus index value $\int\int (dI_{x,y}/dx)^2 dxdy$ that is returned to the computer 34 as the magnitude of the focus index signal along with an average illumination value ($I_{x,y}$) (the magnitude of the average illumination signal). After A/D conversion, the computer 34, using the focus signal processor 39, squares the average illumination value and performs the following division to produce a focus function F(z):

$$F(z) = \sim\sim (dI_{x,y}/dx)^2 dxdy / (\sim\sim I_{x,y} dxdy)^2 \qquad (2)$$

The shape of the focus function is determined by the focus criterion, the microscope and the camera transfer functions, and the imaged object. The properties of a useful focus function are: 1) unimodality, only one maximum; 2) accuracy, the maximum occurs at the in focus position; 3) reproducibility, the sharpness of the focus function curve; 4) implementation, fast calculation of the focus value. Price et al., op. cit., and Groen, F. C. A., Young, I. T. and Ligthart, G., "a Comparison of Different Focus Functions for Use in Autofocus Algorithms," Cytometry 6, pp. 81–91, 1985. Analog circuits have a substantial advantage over digital circuits in implementation if they can match digital circuit performance for the first three properties. This is because analog components operating at conventional video frequencies are relatively ubiquitous and inexpensive.

The analog circuit 36 measures focus directly from the video signal. The output of the camera 30 is in conventional scanned video format, comprising two interlaced fields. The analog circuit 36 can be divided into an analog section and a digital/timing section. The analog portion can be further separated into a focus index part and an average illumination part. Three signals are provided to the computer 34 by the analog circuit 36: a focus index signal, an average illumination signal and a trigger pulse.

Referring now to FIGS. 2 and 4, the video signal representing a magnified image of the area 18 is provided to a conventional sync stripper 50 that eliminates the horizontal and vertical pulses from the video signal. The output of the sync stripper 50 is fed to the input of a bandpass filter 52 having a transfer function H(ω). The filter has a frequency response that passes the high frequency components of the video signal for the reasons given above. The filter 52 produces a filtered signal representing the predetermined high frequencies in the image signal. The filtered signal is provided on an output of the filter 52 that is connected to the input of a transient removal element 56. The transient removal element 56 is gated by synchronization signals extracted from the video signal. In the preferred embodiment, the gating eliminates scanning artifacts produced at the beginning and ending of each of the scan lines of the image signal. In effect, the transient removal element 56 may also be regarded as a window generator which, for each scan line in the video signal, enables a window that is shorter than the scan line, with the respective ends of the scan line extending beyond the ends of the window. Provision of the vertical sync pulse enables the transient removal element 56 to produce a two-dimensional window that may moved over each of the two interlaced fields forming a frame of video in the typical scanned format. The transient removal element 56 provides the filtered signal, with scanning artifacts removed therefrom, on an output that is connected to the input of squaring circuit 58. The squaring circuit squares the magnitude of the predetermined frequency components in the filtered signal, providing the squared magnitudes on an output that is connected to the input of an integrator 60. The integrator 60 integrates the squared magnitudes of the frequency components of the filtered signal, producing a focus index signal in analog form that is provided to a sample and hold circuit 62. The sample and hold circuit 62 is gated to hold a voltage magnitude of the integrated signal produced by the intregrater 60. The voltage magnitude of the integrated signal (the focus index signal) represents a degree of focus of the microscope 12. The focus index signal is provided on the signal path 40 to the computer 34. The elements 52, 56, 58, 60, and 62 therefore form a focus index part of the analog portion of the analog circuit 36. An average illumination part of the analog circuit 36 is formed by an integrator 68 that integrates the video signal, stripped of its sync signals by the sync stripper 50. The integration of the video signal by the integrator 68 over, for example, a line of video, represents average illumination over the line. The magnitude of the integrator 68 is sampled and held by sample and hold circuit 70 whose output forms the average illumination signal provided on signal path 42.

The digital portion of the analog circuit 36 consists of a control timing circuit 66 that receives the image signal intact, including all of its scanning artifacts, such as vertical and horizontal sync portions. The control timing circuit 66 generates reset and hold signals that sequentially synchronize the operations of the integrators 60 and 68 in the sample and hold circuits 62 and 70, respectively. In addition, the control timing circuit 66 produces the trigger signal on the signal line 46.

The control timing circuit 66 further produces the sync signals necessary to form the window implemented by the transient removal element 56.

Digital Section

With reference to FIGS. 2 and 4, the synchronization pulses of the video signal are detected in the control timing circuit 66 by a sync separator 80 (LM1881, National Semiconductor, Arlington, Tex.) which extracts the horizontal and vertical pulses. This timing information is used to create a window that represents an area of the image where the focus function will be implemented. At the very least, the window allows removal of the discontinuities generated by the filter 52 at the ends of horizontal lines. This portion of the analog circuit 36 can be used as a mask generator to select an arbitrary rectangular portion of a video field for processing; any window size can be defined vertically and horizontally by changing the time constants of the two monostable multivibrators. A first portion of the window is established by flip flops 82a and 82b; the second portion by flip-flops 83a and 83b. This type of analog masking has been used for video-dimension analyzers. Yin, F. C. P., Tompkins, W. R., Peterson, K. L. and Intaglietta M., "A Video-Dimension Analyzer," IEEE Transactions on Biomedical Engineering, 19(5), pp. 376–81, 1972. The window information is used by a gated amplifier 84 in the transient removal element 56. After each window, or video field, a trigger pulse is generated. The control timing circuit 66 also produces a sequence of 60 Hz trigger signals that gate the computer 34 for A/D conversion of the corresponding analog values for each field.

Analog Section

The filter 52 is implemented with wide-bandwidth monolithic amplifiers 90–96 having high slew rates and internal unity-gain frequency compensation for high speed and stability. Such high frequency, high-speed amplifiers are more prone to oscillations than low frequency devices. However, this instability was eliminated by reducing the stray capacitance at amplifier inputs and outputs. Power supply bypassing was also used for stability enhancement, and small capacitors were added parallel to the feedback resistors to compensate for unavoidable stray capacitance in the filters.

FIG. 3a shows the plot of a horizontal video line 100 and selected subsequent analog processed outputs. The sync stripper 50 removes the sync portion of the composite video signal per waveform 102. The reference level is at ground and since the sync tip is negative the output will have the sync removed and place the blanking level at ground. After the video signal input is stripped of its synchronizing pulses, the signal is fed to both the filter 52 in the focus index section and the illumination integrator 68.

Each of the operational amplifiers 90–96 of the filter (LT1220, Linear Technology Corporation, Milpitas, Calif.) is used in a two-pole active Butterworth filter configuration, with the four operational amplifiers arranged in a 4th order lowpass sections 52a and a 4th order highpass section 52b. A frequency response from 2 to 4 MHz was selected, for matching the digital filter response, which represents the transfer function of the optics in the microscope 12. A bandpass gain of 2.56 was used to compensate for signal attenuation. Due to the wide bandwidth and unity compensation of the components, good performance was obtained without further custom design. With the correct choice of the components, cutoff frequency is independent of amplifier bandwidth, and is determined only by the respective R-C networks in the low-pass section 52a and the high-pass section 52b. Manifestly, these networks may include manually-adjustable elements. Waveform 104 demonstrates the filter output.

The windowed, filtered signal is offset, amplified and squared, as shown in waveforms 106 and 108. The filtered, squared signal is then integrated over one video field by the integrator 60. The integrator 60 includes reset, integrate the filtered signal for focus index calculation, and, over the diode 114, hold intermediate focus while there is no significant output from the filter 52. Previous analog autofocus circuit designs, lacking the hold control, exhibited focus index output decay between image features. This is illustrated clearly by waveform 109 in FIG. 3a, where, over the portion of the squared waveform 108 marked "dead space", the magnitude of the integrated signal produced by the intregrator 60 does not decay. Using the integrator 60 with diode 114 instead of the conventional integrator ensures that the focus index more ideally matches the true mathematical integral for each video field. The output of the integrator 68 is similarly controlled by capacitor 116 and diode 118.

The average illumination section takes the sync stripped video signal and measures the average illumination by integrating the signal over one field. A sample and hold circuit is used to maintain the final analog values for the A/D board. The final output from this integration, and the focus index, are then converted by the analog-digital board in the computer 34. The trigger signal is sent to the computer at the end of each field to start a new conversion. Focus index, average illumination and trigger, with their respective grounds, are conventionally connected to the computer 34 or signal paths 40, 42 and 46, respectively.

Windowing in the analog circuit 36 is shown in FIG. 3b, and can be understood with reference to FIGS. 2 and 4. For the scan line dimension, a horizontal window pulse 120 is created for any line of video by the flip-flops 82a–82b in response to horizontal line blanking. A vertical window pulse 124 is produced by the flip-flops 83a–83b in response to vertical blanking. The transistor-diode circuit 126 responds to the pulses 120 and 124 as an AND gate, transmitting the filtered signal from the filter 52 to the squaring circuit 58 when both pulses are high. Manifestly, counting or timing may be employed with the flip-flops in the control timing circuit 66 to selectively adjust the dimensions of a window.

Focusing Software, Autofocus Algorithm

In the focus processor 39, an interrupt service routine (ISR) was implemented to acquire the analog value of the focus index and average illumination signals, based on the trigger signal supplied by the analog circuit 36. This routine also controlled focus position, acquisition of the analog values from the autofocus circuit and calculation of the normalized degree of focus. Programs were written in C and assembler languages. The C routines were compiled with Metaware High C (Santa Cruz, Calif.). A Phar Lap (Cambridge, Mass.) assembler was used for the interrupt service routines.

At the end of each field a trigger pulse starts the ISR, which transfers the analog values of the focus index and average illumination signals to arrays accessible to C routines for calculating and setting best focus.

In order to determine a best focus, the computer 34 executes a focus sequence in which the Z-axis position of the objective lens 14 is sequenced through a plurality of focus positions ($z_i$). At each focus position the magnitude of the focus index and average illumination signals are taken and a focus function value ($F(z_i)$) is calculated according to equation (2). Focus function values are stored at 130, FIG. 1, by the computer 34.

After each focus sequence, with focus indices stored by the computer 34 for a number of positions, a power-weighted average is used to find best focus. Unusually shaped focus curves containing multiple extrema may be produced by discrete vertical distributions of cellular components. For these reasons, the weighted average $$W_a = \frac{\sum z(f_z)^n}{\sum (f_z)^n} \quad (3)$$

is used, where $W_a$ is the power-weighted average position, z is the vertical (Z-axis) position, $F_z$ is the result of the focus function (equation (2)) calculated from an image acquired at one z position, and n is the power of the weighting. The power accentuates the peak values and the average reduces the effect of the 3D nature of the specimen.

Experimental Results

Contrast in a microscope image is not an inherent property of a specimen. Rather it is a product of (1) the interaction of the illuminating light waves and specimen structure and (2) the MTF and contrast generation mode of the microscope. Point (1) depicts both in specimen structure and on the condition of the illuminating light wave; point (2) depends both on the condition of the illumination and how the waves leaving the specimen are treated. Inoué, S., "Video Microscopy", Plenum Press, New York, 1986.

Phase contrast microscopy was used as the imaging technique for autofocus in these experiments. In phase contrast, phase changes introduced by the transparent cells are transformed into changes in intensity. Born, M. and Wolf, E., "Principles of Optics", Pergamon Press, 1989. This creates contrast in the image that is useful for performing autofocus. Phase contrast also performs an optical highpass filter. Inoué, S., "Video Microscopy", Plenum Press, New York, 1986. Experimentally, phase contrast has also been shown to be more prone to exhibit side peaks in the focus function curve. Price, J. H. et al., op cit. Thus, it is important to carefully select the high frequencies to ensure unimodality.

Figure 5:
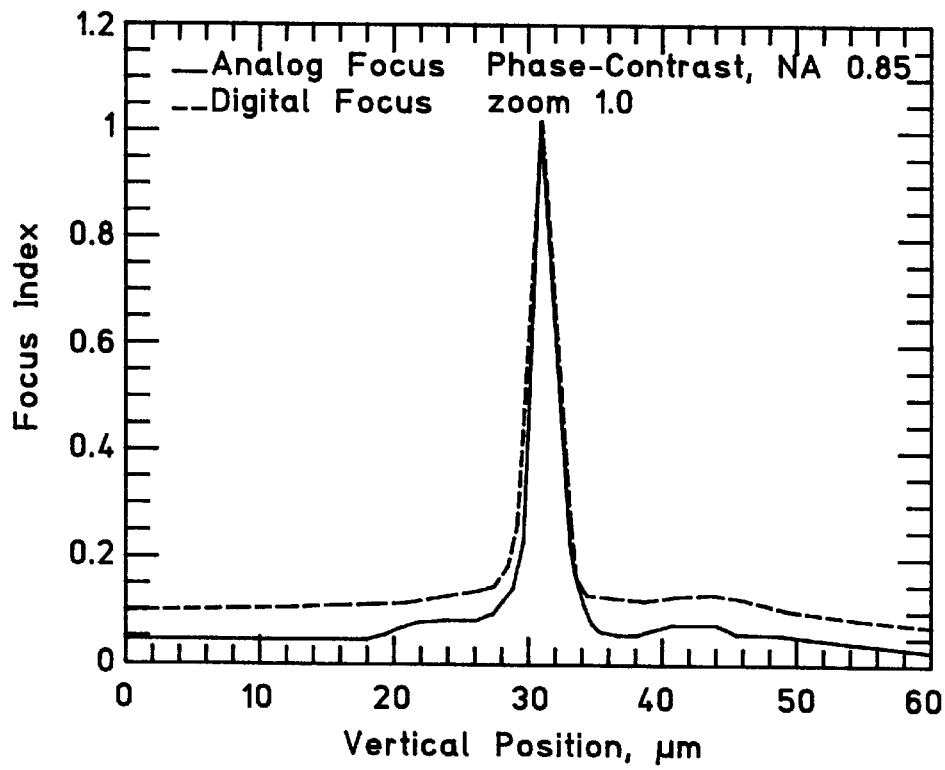
FIG. 5 is graph illustrating digital and analog focus function curves illustrating experimental results with the operation of an autofocus microscope system with the analog circuit of FIGS. 2 and 4.

In FIG. 5 the plot of a phase-contrast experiment of a cell monolayer at different Z-axis positions is shown. Similar focus function curves are obtained by the analog and the digital versions, peak widths and sharpness of the functions are primarily unimodal. The curves exhibit damped side peaks outside the main lobe. This behavior is exacerbated by undersampling at unit zoom. Increasing the magnification results in the Nyquist sampling and this behavior is eliminated. The low cutoff of the filter captures mid-range frequencies for which a monotonic behavior cannot be assumed. The tendency toward side peaks is reduced with the increased frequency response of the focus index system transfer function, which includes the filter, CCD camera, and optical transfer function.

Figure 6:
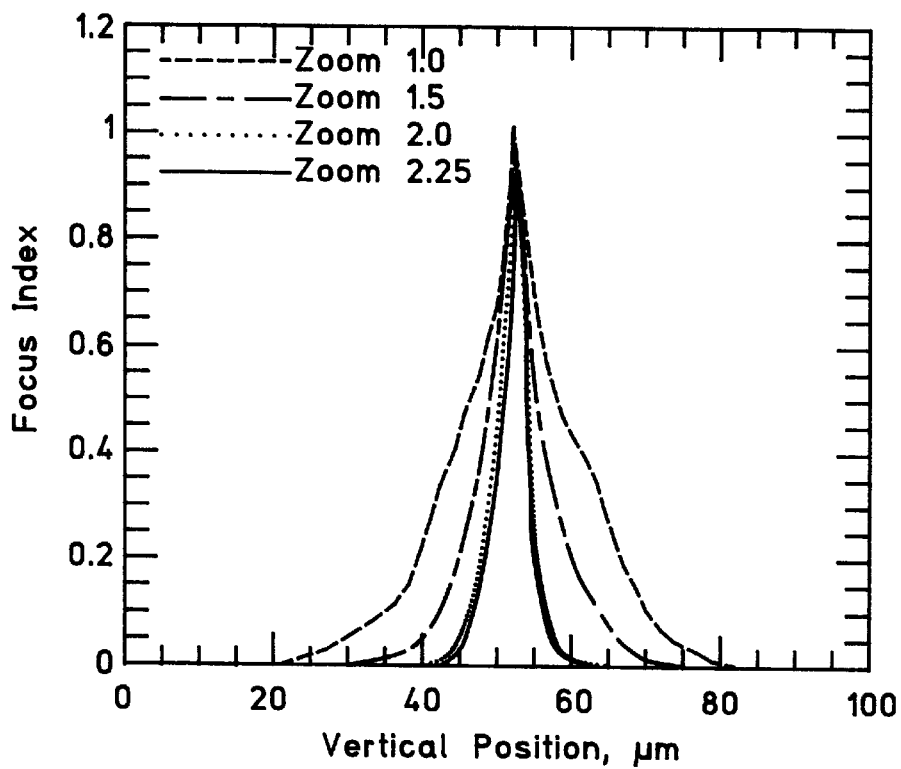
FIG. 6 is a graph showing analog focus function curves at different zooms for a thick cell monolayer by the autofocus microscope system of FIG. 1.

FIG. 6 shows a plot of the analog focus index using a thick cell monolayer. The 3-D structure of the specimens creates differences of best focus and accounts for the broadening of the focus function. The increased specimen depth also seems to enhance the side peaks. Thus, the shape of the focus curve depends both on the specimen and the system transfer function. The sampling period for a particular experimental condition was calibrated using images of a micrometer slide with a 10 µm spacing. At a zoom of 1× (using the 40× objective) the period was 33 nm. The resolving power is given by the Rayleigh criterion, $d=1.22\lambda/(NA_{obj}+NA_{cond})$. With a 500 nm illumination, a 0.52 $NA_{cond}$ and 0.85 $NA_{obj}$, a resolution of 445 nm is obtained. The required Nyquist sampling is then 225.5 nm. A magnification of (303/222.5)= 1.36× is thus required for Nyquist sampling. For a variety of practical reasons, one must, in fact, oversample further. Inoué, S., op. cit.

The principal advantage of this carefully designed analog circuit is low cost with no performance sacrifice. The digital processing for real time autofocus demands the use of a real time image processor with pipeline architecture which can be an order of magnitude more expensive. In addition, increasing the complexity of the digital filter involves adding coefficients, which can further increase cost or reduce speed. On the other hand, digital autofocus makes reprogramming a simple task, and for real time operation, the digital image processing resources can be used for simple one-dimensional filters as discrete approximations of the derivative filters (e.g. the {1, −1} and {−1, 2, −1} highpass filters and the {1, 0, −1} bandpass filter). Given the cost of the digital image processing, however, replacement of the digital implementation with an inexpensive analog circuit of equal performance that frees this important resource for other tasks may be the most important consideration.

One drawback with analog circuits in general (at least with respect to their digital equivalents) is limited dynamic range. The digital dynamic range is proportional to the square root of the product of the pixels and gray levels. Analog processing is limited to the number of bits of an A/D converter. Of course, the limited analog dynamic range could be overcome by addition of an automatic gain control circuit. On the other hand, analog implementation permits an arbitrary upper cutoff frequency (up to the limit of the camera), whereas in the digital version this upper limit is set by the image processor. This simplifies matching the focus cutoff frequency in the filter 52 to the microscope optical transfer function to generate a sharper filter function curve for improved autofocus reproducibility. Assuming, a CCD camera capable of 768 pixels/line, image processor 38 digitized only 512 pixels/line. With the analog circuit 36, plug-in headers may be used for the filter 52 to simplify matching of the filter function with each video camera and optical transfer function combination. The analog circuit filter 52 is much easier and less expensive to change than the resolution of the image processor 38.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit and scope of the claimed invention.

We claim:

1. In an autofocus system having a microscope, a source of an image signal representing a magnified image produced by the microscope, and an automatic microscope focus control that focuses the microscope in response to a focus index signal, a circuit for producing the focus index signal, comprising:

a filter for providing a filtered signal representing predetermined frequencies in the image signal;

a transient remover connected to the filter for removing scanning artifacts from the filtered signal;

a squaring circuit connected to the transient remover for squaring magnitudes of frequency components of the filtered signal; and an index integrator connected to the squaring circuit for producing a focus index signal representing focus of the microscope by integrating squared magnitudes of the frequency components of the filtered signal.

2. The circuit of claim 1, further including an illumination integrator for producing an average illumination signal in response to the image signal.

3. The circuit of claim 2, wherein the focus control includes a processor for producing a focus position signal representing a focus function of the microscope in response to the focus index and the average illumination signal.

4. The circuit of claim 1 further including a diode connected to an output of the index integrator for preventing the focus index signal from decaying.

5. The circuit of claim 3 further including:

a first diode connected to an output of the index integrator for preventing the focus index signal from decaying; and a second diode connected to the output of the illumination integrator for preventing the average illumination signal from decaying.

6. The circuit of claim 1, wherein the transient remover applies a one-dimensional window to the filter signal.

7. The circuit of claim 1, wherein the transient remover applies a two-dimensional window to the filter signal.

8. The circuit of claim 1, wherein the image signal is a video signal.

9. The circuit of claim 8, wherein the scanning artifacts include ends of a scan line of the video signal.

10. The circuit of claim 1, wherein the filter has a transfer characteristic substantially equal to an optical transfer characteristic of the microscope.

11. An autofocus system for producing a focus index signal in response to an image signal representing an image produced by an imaging device having an automatic focus control that focuses the device in response to the focus index signal, comprising:

a filter for providing a filtered signal representing predetermined frequencies in the image signal;

a transient remover connected to the filter for removing scanning artifacts from the filtered signal;

a squaring circuit connected to the transient remover for squaring magnitudes of frequency components of the filtered signal; and an index integrator connected to the squaring circuit for producing a focus index signal representing focus of the device by integrating squared magnitudes of the frequency components of the filtered signal.

12. The system of claim 11, further including an illumination integrator for producing an average illumination signal in response to the image signal.

13. The system of claim 12, wherein the focus control includes a processor for producing a focus position signal representing a focus function of the device in response to the focus index and the average illumination signal.

14. The system of claim 13 further including:

a first diode connected to an output of the index integrator for preventing the focus index signal from decaying; and a second diode connected to the output of the illumination integrator for preventing the average illumination signal from decaying.

15. The system of claim 11 further including a diode connected to an output of the index integrator for preventing the focus index signal from decaying.

16. The system of claim 11, wherein the transient remover applies a one-dimensional window to the filter signal.

17. The system of claim 11, wherein the transient remover applies a two-dimensional window to the filter signal.

18. The system of claim 11, wherein the image signal is a video signal.

19. The system of claim 18, wherein the scanning artifacts include ends of a scan line of the video signal.

20. The system of claim 11, wherein the filter has a transfer characteristic substantially equal to an optical transfer characteristic of the device.

* * * * *

UNITED STATES PATENT AND TRADEMARK OFFICE
CERTIFICATE OF CORRECTION

PATENT NO.  : 5,995,143
DATED       : November 30, 1999
INVENTOR(S) : Price et al It is certified that error appears in the above-identified patent and that said Letters Patent is hereby corrected as shown below:

On the title page,item

[56] References Cited

U.S. Patent Documents 5,548,661   08/20/96   Price et al

Signed and Sealed this

Twenty-seventh Day of February, 2001

Attest:

NICHOLAS P. GODICI

Attesting Officer     Acting Director of the United States Patent and Trademark Office